United States Patent
Liu et al.

(10) Patent No.: US 9,341,811 B2
(45) Date of Patent: May 17, 2016

(54) METHOD AND APPARATUS FOR ADJUSTING-FREE AUTOMATIC FOCUS

(71) Applicant: TOPRAY MEMS INC., Hsinchu (TW)

(72) Inventors: Chin-Sung Liu, Hsinchu (TW);
Chien-Chung Pien, Hsinchu (TW);
Ping-Ju Chang, Hsinchu (TW)

(73) Assignee: TOPRAY MEMS INC., Hsinchu (TW)

( * ) Notice: Subject to any disclaimer, the term of this patent is extended or adjusted under 35 U.S.C. 154(b) by 33 days.

(21) Appl. No.: 14/454,757

(22) Filed: Aug. 8, 2014

(65) Prior Publication Data
US 2016/0041362 A1    Feb. 11, 2016

(51) Int. Cl.
*G02B 7/02*    (2006.01)
*G02B 7/09*    (2006.01)
*G02B 13/00*   (2006.01)
*G03B 13/36*   (2006.01)

(52) U.S. Cl.
CPC ........ *G02B 7/09* (2013.01); *G02B 7/025* (2013.01); *G02B 13/001* (2013.01); *G03B 13/36* (2013.01)

(58) Field of Classification Search
CPC ............ G02B 7/04; G02B 7/023; G02B 7/02; G02B 7/021; G02B 3/00
USPC .............. 359/823, 819, 811, 642, 822, 900
See application file for complete search history.

(56) References Cited

U.S. PATENT DOCUMENTS 7,221,524 B2 *   5/2007   Ye ............................ G02B 13/16
                                                               348/E5.027

* cited by examiner

*Primary Examiner* — Tuyen Tra
(74) *Attorney, Agent, or Firm* — Lin & Associates Intellectual Property, Inc.

(57) ABSTRACT

According to one exemplary embodiment, a method for adjusting-free automatic focus includes: mounting a lens in a lens holder seat with an adhesion scheme; setting focus position of a scene of infinity distance located on a back plane passing through a sensor integrated circuits; and moving the lens a travel distance toward a scene, wherein an image of the scene focuses on a front plane of the sensor integrated circuits.

5 Claims, 5 Drawing Sheets

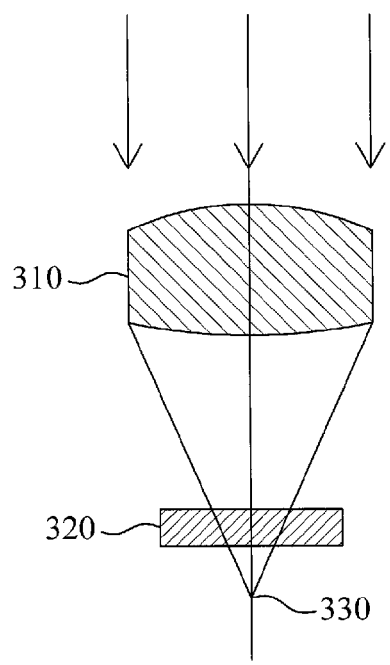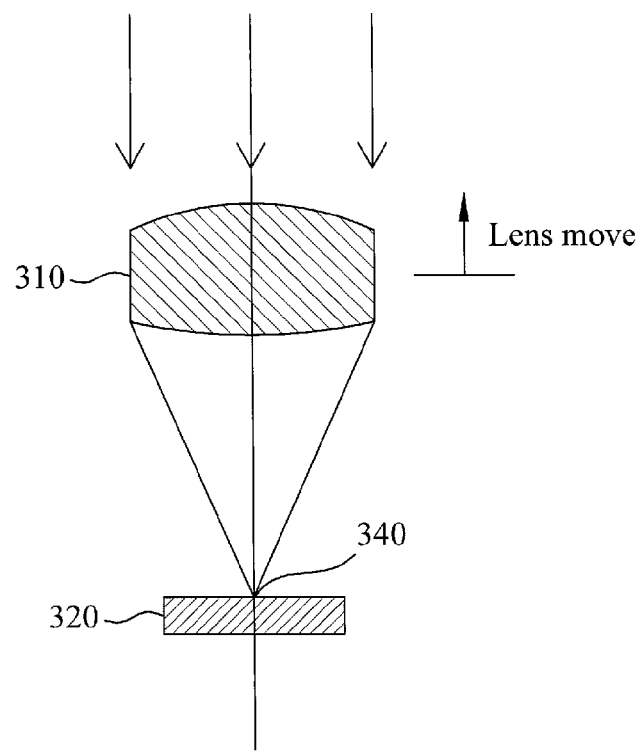
FIG. 3A  FIG. 3B

METHOD AND APPARATUS FOR ADJUSTING-FREE AUTOMATIC FOCUS

TECHNICAL FIELD

The present disclosure generally relates to a method and apparatus for adjusting-free automatic focus.

BACKGROUND

Focal length of the lens often has considerable error due to assembly and lens accuracy. Thus when assembly the compact camera module (CCM) of the mobile electronic device such as a phone, one would need rotate the thread to make up and down focus adjustment through the outside outer screw of the lens and the inner screw on the lens voice coil motor (VCM) holder to compensate this focus length error. Usually the mobile phone camera module in the assembly, the voice coil motor is non-energized condition; the lens is rotated for making up and down adjustment until object focal distance (infinity) is corresponded. That is the object focal distance is focused on a surface of a sensor integrated circuit. FIG. 1 illustrates a diagram of conventional focus point for the image of infinity distance. As shown in FIG. 1, image of an object 160 of infinite distance passes through objective lens 150, due to the focus point 110 is set on a surface of a sensor integrated circuit 120, the image is in clear state. Wherein 130 and 140 denote the positive and negative error value when focused, respectively. This error value will cause the image into unclear state. This conventional technique sets the focus point of the lens on the proper position 110 of the surface 120 of the sensor integrated circuit by focusing action.

Furthermore, this structure with screw and thread has the problem of matching the size of the screw, and small particles are generated due to friction when the screw is rotated up and down for focus adjustment, thereby the production yield is affected by this problem.

SUMMARY

The exemplary embodiments of the disclosure may provide a method and apparatus for adjusting-free automatic focus.

One exemplary embodiment relates to a method for adjusting-free automatic focus, the method comprising: mounting a lens in a lens holder seat with an adhesion scheme; setting focus position of a scene of infinity distance located on a back plane passing through a sensor integrated circuit; and moving the lens a travel distance toward a scene, wherein an image of the scene focuses on a front plane of the sensor integrated circuit.

Another exemplary embodiment relates to an apparatus for adjusting-free automatic focus, the apparatus comprising: a lens, a lens holder seat, and a sensor integrated circuit, the lens is fixed to the lens holder seat with adhesion scheme, the sensor integrated circuit is set on focus plane of the lens.

BRIEF DESCRIPTION OF THE DRAWINGS

FIG. 3a illustrates the step 220 in FIG. 2, according to an exemplary embodiment.

FIG. 3b illustrates the step 230 in FIG. 2, according to an exemplary embodiment.

DETAILED DESCRIPTION OF THE DISCLOSED EMBODIMENTS

Figure 1:
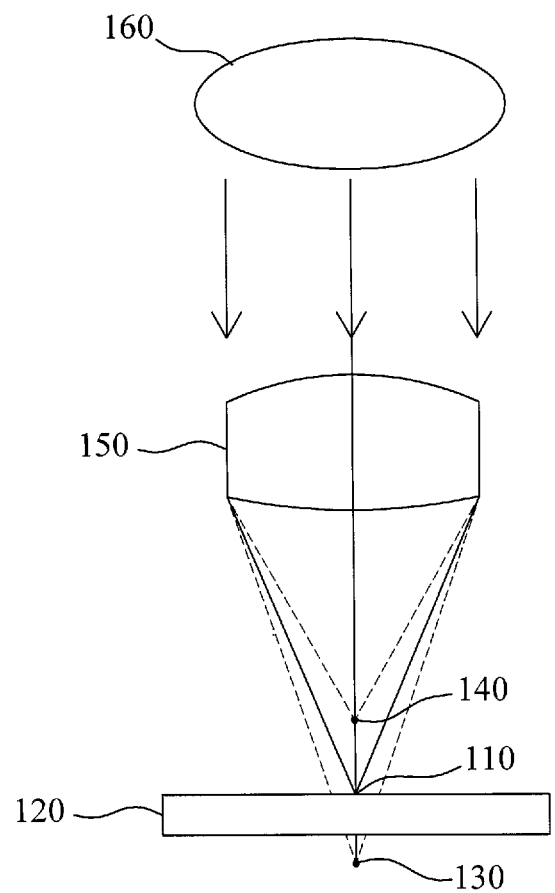
FIG. 1 illustrates a diagram of conventional focus point for scene of the infinity distance.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

Figure 2:
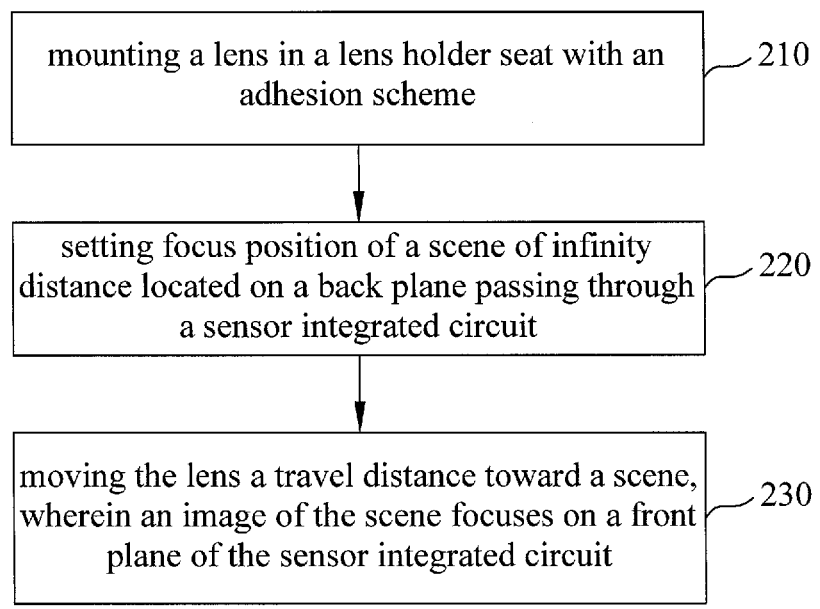
FIG. 2 illustrates a flowchart of a method for adjusting-free automatic focus, according to an exemplary embodiment.

FIG. 2 illustrates a flowchart of a method for adjusting-free automatic focus, according to an exemplary embodiment. Referring to FIG. 2, the method of adjusting-free automatic focus includes mounting a lens in a lens holder seat with an adhesion scheme (step 210); setting focus position of a scene of infinity distance located on a back plane passing through a sensor integrated circuit (step 220); and moving the lens a travel distance toward a scene, wherein an image of the scene focuses on a front plane of the sensor integrated circuit (step 230). Wherein the adhesion scheme is a gluing adhesion means, such as one of the dot gluing, inject gluing, or paint gluing.

FIG. 3a illustrates the step 220 in FIG. 2, according to an exemplary embodiment. And FIG. 3b illustrates the step 230 in FIG. 2, according to an exemplary embodiment. As shown in FIG. 3a, the method sets focus position 330 of a scene of infinity distance of the lens 310 located on a back plane passing through a sensor integrated circuit 320. And a shown in FIG. 3b, the method moves the lens 310 a travel distance toward a scene direction, an image 340 of the scene focuses on a front plane of the sensor integrated circuit 320.

Figure 4:
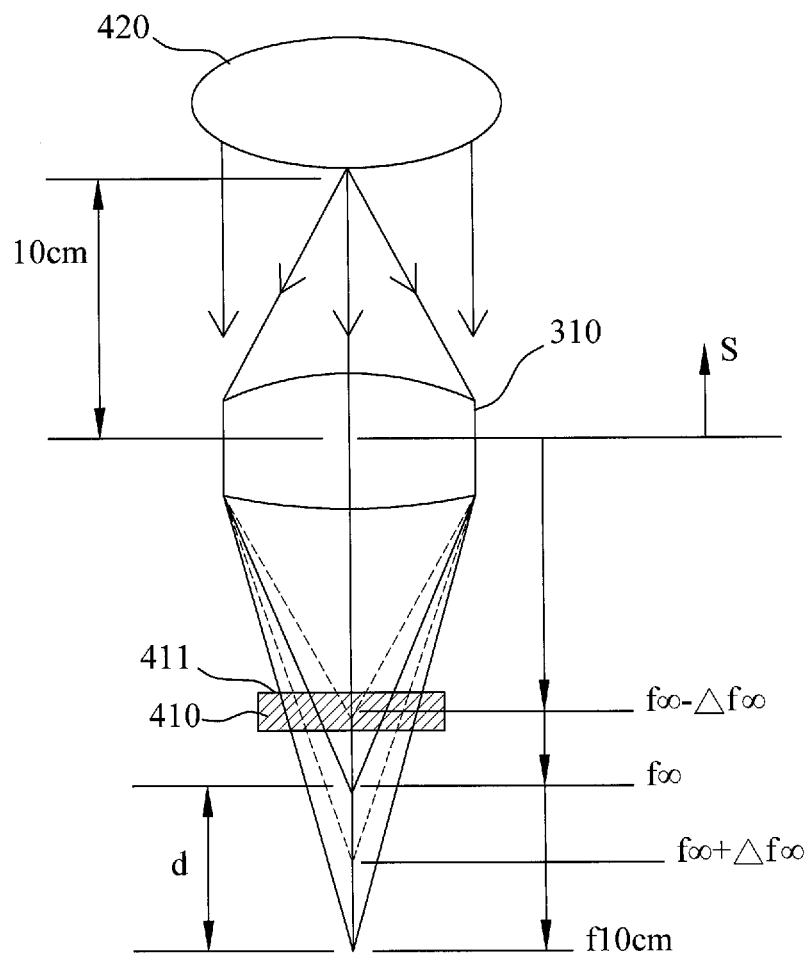
FIG. 4 illustrates the calculation method of a lens moving a travel distance, according to an exemplary embodiment.

FIG. 4 illustrates the calculation method of a lens moving a travel distance S, according to an exemplary embodiment. As shown in FIG. 4, when a focus error value $\Delta f\infty$ of the lens 310 is a known number and when the lens 310 is mounted in the lens holder seat (not shown), the focus position $f\infty$ of the lens 310 is added with its error value $\pm \Delta f\infty$, the focal point position $f\infty$ always fall on the back plane of the sensor integrated circuit 410.

In the exemplary embodiment, assuming that the distance between $f\infty$ and f10 cm is d, a travel distance S of the lens 310 is $S \geq d + 2\Delta f\infty$. Wherein $f\infty$ is the focus position of the lens for scene of infinity distance; f10 cm is the focus position of the lens for a scene 420 of 10 cm distance. When the lens 310 moves towards the scene 420 a travel distance S, imaging point $f\infty$ of infinity distance and imaging point f10 cm of the lens 310 will go through an image place 411 of the sensor integrated circuit 410 to produce automatic focus.

Figure 5:
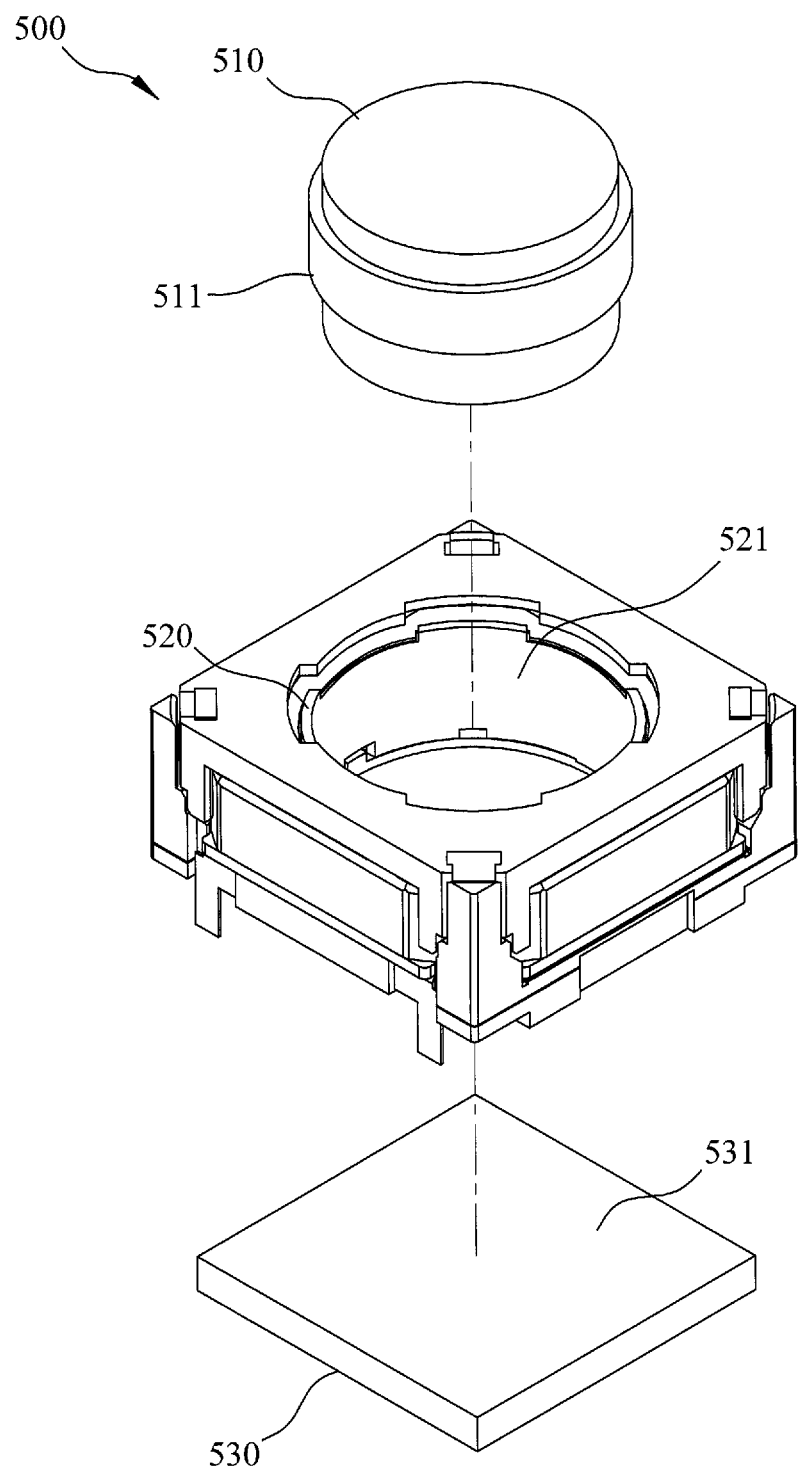
FIG. 5 illustrates structure of an apparatus for adjusting-free automatic focus, according to another exemplary embodiment.

FIG. 5 illustrates structure of an apparatus for adjusting-free automatic focus, according to another exemplary embodiment. As shown in FIG. 5, an apparatus of adjusting-free automatic focus 500 includes a lens 510, a lens holder seat 520, and a sensor integrated circuit 530. The outer edge 511 of the lens 510 is fixed to an inner bearing surface 521 of the lens holder seat 520 by an adhesion scheme; the sensor integrated circuit 530 is set on the focus plane 531 of the lens 510. Wherein an outer edge 511 of the lens 510 and an inner bearing surface 521 of the lens holder seat 520 are smooth surfaces. And the adhesion scheme is a gluing adhesion means, such as one of dot gluing, inject gluing, or paint gluing.

In summary, the present disclosure provides a method and apparatus of adjusting-free automatic focus to avoid error of focus, and can reduce focus time of the lens, thereby increases the attractiveness of the focus apparatus itself.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for adjusting-free automatic focus, comprising:
   mounting a lens in a lens holder seat with an adhesion scheme;
   setting focus position of a scene of infinity distance located on a back plane passing through a sensor integrated circuit; and
   moving said lens a travel distance toward a scene, wherein an image of said scene focuses on a front plane of said sensor integrated circuit.

2. The method as claimed in claim 1, wherein focus position of said scene is focal point position of said lens added with a focus error value, said focus error value is a known number.

3. The method as claimed in claim 1, wherein said travel distance $S \geq d + 2\Delta f\infty$, wherein d is a distance between said focus position for a scene of infinity distance and said focus position for a scene of 10 cm, and $\Delta f\infty$ is said focus error.

4. The method as claimed in claim 1, wherein said adhesion scheme is a gluing adhesion means.

5. The method as claimed in claim 4, wherein said gluing adhesion means is one of point gluing, inject gluing, or paint gluing.

* * * * *